United States Patent
Yamada et al.

(10) Patent No.: US 6,972,845 B2
(45) Date of Patent: Dec. 6, 2005

(54) COLLIMATOR AND SPECTROPHOTOMETER

(75) Inventors: Takeo Yamada, Yokohama (JP); Tomoyuki Kobayashi, Yokohama (JP)

(73) Assignee: Nireco Corporation, Hachioji (JP)

(*) Notice: Subject to any disclaimer, the term of this patent is extended or adjusted under 35 U.S.C. 154(b) by 336 days.

(21) Appl. No.: 10/262,802

(22) Filed: Oct. 2, 2002

(65) Prior Publication Data
US 2003/0076499 A1 Apr. 24, 2003

(30) Foreign Application Priority Data
Oct. 23, 2001 (JP) .............................. 2001-324351

(51) Int. Cl.[7] ......................... G01N 21/25; G02B 27/30
(52) U.S. Cl. ...................................... 356/419; 359/641
(58) Field of Search .................... 356/419; 359/641; 250/505.1, 363.1; 378/147

(56) References Cited

U.S. PATENT DOCUMENTS

| | | | |
|---|---|---|---|
| 4,043,669 A * | 8/1977 | Gehatia et al. | ............. 356/340 |
| 4,465,540 A * | 8/1984 | Albert | ......................... 359/641 |
| 5,298,736 A | 3/1994 | Dreher et al. | |
| 5,872,655 A | 2/1999 | Seddon et al. | |
| 6,000,270 A | 12/1999 | Mullen | |
| 6,057,925 A | 5/2000 | Anthon | |
| 6,185,278 B1 * | 2/2001 | Appleby et al. | ............. 378/149 |
| 6,624,431 B1 | 9/2003 | Foster et al. | |
| 6,630,999 B2 * | 10/2003 | Shroder | ....................... 356/419 |

FOREIGN PATENT DOCUMENTS

| | | |
|---|---|---|
| DE | 44 30 615 A1 | 2/1996 |
| JP | 61-185011 U | 11/1986 |
| JP | 5-322653 A | 12/1993 |
| JP | 6-349407 A | 12/1994 |
| JP | 6-349407 A | 12/1994 |
| WO | WO 01/07939 A1 | 2/2001 |

OTHER PUBLICATIONS

Hamamatsu Capillary Plate catalog 4 pages: For Liquid/Gas Filter, Differential Pressure Pumping, Orifice for Mass Spectroscopy, Light/ X-ray Collimator, Nov. 1997, Hamamatsu Photonics KK Electron Tube Center.
Fiber Optic Plates (FOP) catalog; 2 pages.
T. Nakayama et al; Characteristics of the Newly Developed FOPs ITEJ Technical Report, Vol. 16, No. 82, pp. 7-12, Dec. 1992.
T. Nakayama et al; Fiber Optic Plate and its application; ITEJ Technical Report, Vol. 14, No. 53; pp. 1-6; Sep. 1990.

* cited by examiner

Primary Examiner—Gregory J. Toatley, Jr.
Assistant Examiner—Kara Geisel
(74) Attorney, Agent, or Firm—Frishauf, Holtz, Goodman & Chick, P.C.

(57) ABSTRACT

A collimator obtained by the alternate stacking of metal sheets 1 (40 μm thick) having holes 4 with a width of 2200 μm in the center thereof, and metal sheets 2 (10 μm thick) devoid of holes (the metal sheets 1 with the holes 4 are shown in the state in which they exist before being cut in the manner described below, the metal sheets 1 in the upper portion of the figure and the metal sheets in the bottom portion are not connected with each other in the finished product). The opposite sides are held by metal pressing sheets 3 that are 2 mm thick. These metal sheets and pressing sheets are bonded by means of diffusion bonding based on thermocompression bonding. The portions with the vertical through-holes 4 (40 μm×2000 μm) thus become light-transmitting portions, the metal sheets 2 serve as partitions between adjacent holes 4, and light collimated to a width of 40 μm can ultimately pass through. A compact collimator having high wavelength resolution without wavelength dependence can thus be achieved.

6 Claims, 14 Drawing Sheets

(a)

(b)

COLLIMATOR AND SPECTROPHOTOMETER

BACKGROUND OF THE INVENTION

1. Field of the Invention

The present invention relates to a high-performance collimator and compact spectrophotometer capable of performing spectrophotometry without using a prism or diffraction grating.

2. Description of the Related Art

Conventionally, a method for measuring spectral intensity by guiding light in a different direction for each wavelength using a prism or a diffraction grating, irradiating the light to a linear sensor or the like, and measuring the output from the elements of the linear sensor was generally used to perform spectrophotometry. However, a certain amount of space is needed to separate and guide the diffracted light in different directions according to wavelength when a prism, diffraction grating, or the like is used. An unacceptably large spectrophotometer thus resulted. Other drawbacks included the fact that the light intensity decreased due to the measured light being passed through a slit when guided to the prism or diffraction grating, and that high-speed measurement was difficult to accomplish because the storage time required for the linear sensor was considerable.

Several methods featuring a linear variable filter (occasionally referred to hereafter as LVF) have been suggested and developed with the aim of overcoming the abovementioned drawbacks. For example, the technique disclosed in Japanese Patent Application Laid-open No. H5-322653, and the technique disclosed in U.S. Pat. No. 5,872,655 are widely known, and a spectrophotometer that uses a different system of linear variable filter is disclosed in U.S. Pat. No. 6,057,925 and is commercially available. In this techniques, diffracted light emitted from a linear variable filter is focused on a linear sensor by inserting an optical system for an erect same-size image between the linear variable filter and linear sensor, and a GRIN (Gradient Index) lens or a Micro Lens Array is used as a compact focusing system for the erect same-size image.

The following problems nonetheless exist in the system disclosed in Japanese Patent Application Laid-open No. H5-322653, and in the method disclosed in U.S. Pat. No. 5,872,655. Specifically, multiple reflections occur between the linear variable filter and linear sensor due to these methods being configured such that the linear variable filter is attached to the linear sensor, and the spectral characteristics thus deteriorate.

While these problems are eliminated in the method disclosed in U.S. Pat. No. 6,057,925, other problems nonetheless occur. Specifically, the GRIN lens comprises a total of 28 cylindrical lenses disposed in two rows. Consequently, when a surface image similar to a linear variable filter is projected, exactly 28 peaked irregularities occur in the output of the linear sensor because a composite image made by 28 cylindrical lenses is focused on the linear sensor. The dimensional accuracy of the spectral wavelength output will thereby decrease even when the positional accuracy of the spectral wavelength is enhanced.

Meanwhile, mechanical collimators are conventionally used for transmitting light in a parallel fashion. Specifically, a large-scale collimator is used in large-scale optical systems such as edge locators and width meters for web-shaped measurement objects. This kind of mechanical collimator may also be used in the transmission of light between a linear variable filter and a linear sensor. However, such collimators have bulky structures, and it was believed to be impossible to manufacture a compact product that satisfies high resolution requirements and is capable of being used in transmission of light between a linear variable filter and a linear sensor.

Aiming to develop a method for overcoming the aforementioned problems, the inventors have succeeded in obtaining spectral results having high wavelength resolution and devoid of any irregularities by placing a fiber optic sheet (hereafter abbreviated as FOP) between the linear variable filter and the linear sensor, or at the forward surface of the linear variable filter, and have filed for a patent as patent application Ser. No. 2001-078176 (hereafter referred to as "the prior application"). An FOP having high directivity (NA=0.35) is used especially for enhancing wavelength resolution in the embodiments of this invention.

A structural diagram thereof is depicted in FIG. 16. Fiber optic sheets 33a and 33b are provided above the sensor package 32 of a linear sensor 31 in the manner shown in the figure, and a linear variable filter 34 is bonded to the fiber optic sheet 33a on the top thereof. The space between the linear sensor 31 and the fiber optic sheet 33b is filled with a transparent resin 35, and is approximately 0.01 mm wide. The numerical aperture (NA) of the fiber optic sheets 33a and 33b is assumed to be 1 in this embodiment.

The reason that the fiber optic sheets 33a and 33b are divided into two layers is that the fiber optic sheet 33a is used instead of the surface cover glass of the sensor package 32 of the linear sensor 31; and when this is unnecessary, a single fiber optic sheet may be used, or 33a and 33b may be formed in an integrated manner.

For light entering the linear variable filter 34 from the upper portion of the figure, only Light with a wavelength determined by the entry location thereof in the linear variable filter 34 is transmitted, spectrally divided according to the location of the linear variable filter 34, guided by the fiber optic sheets 33a and 33b, and directed through the transparent resin 35 to the corresponding pixel of the linear sensor 31. Spectral measurement can thus be performed by processing the output of each pixel of the linear sensor 31.

Because the linear variable filter 34 and fiber optic sheet 33a are attached, there is no light diffusion in the space therebetween, but a slight degree of light diffusion still occurs between the fiber optic sheet 33b and the linear sensor 31 even if the numerical aperture of the fiber optic sheets 33a and 33b is equal to 1. However, this does not present much of a problem, since the interval thereof is approximately 0.01 mm. The light transmission rate from the linear variable filter 4 to the linear sensor 1 is approximately 60–70% in this embodiment, which is apparently by no means inferior when compared with the conventional example, in which a linear variable filter and linear sensor are adjacent.

Problems nonetheless exist in this method as well. Specifically, the effective waveband of the FOP in which the actual NA is 0.35, ranges only from 400 to 800 nm. Consequently, high-resolution spectral results cannot be obtained for longer wavelengths (800 nm or greater). At the same time, it is said that linear variable filters used for wave length from 0.4 $\mu$m to 20 $\mu$m can be manufactured.

To use an FOP at greater wavelengths, a fiber for the waveband thereof must be newly manufactured. It is costly and impractical to make an optical fiber corresponding to each wavelength. Another drawback is that light transmissivity is attenuated when NA=0.35, even in a visible-range FOP.

SUMMARY OF THE INVENTION

An object of the present invention, which was developed in view of the above situation, is to provide a wavelength-independent compact collimator having high wavelength resolution, and to provide a compact spectrophotometer that uses this collimator and is capable of spectral measurement with high speed and high accuracy.

The first invention for achieving the aforementioned object is a collimator in which the light transmission path is air.

Because the light transmission path consists of air in the present invention, it is possible to obtain a wavelength-independent collimator having little attenuation of infrared light. Specifically, the optical path length for a usual collimator is approximately 0.5–5 mm, and there is almost no need to consider wavelength dependence when the device is used from the ultraviolet to far infrared regions.

The second invention for achieving the aforementioned object is a collimator formed by alternately stacking first metal sheets having holes and second metal sheets devoid of holes, pressing opposite sides thereof with pressing sheets, integrating these parts by diffusion bonding based on thermocompression, and cutting the portions corresponding to the portions where the holes exist in the first metal sheets, in the stacking direction of the metal sheets.

The collimator formed according to the present invention is configured such that a plurality of holes whose width is equal to the thickness of the aforementioned first metal sheets are formed in parallel, leaving open an interval equal to the thickness of the aforementioned second metal sheets. Specifically, a collimator is formed having a number of openings equal to the number of first metal sheets. The first metal sheets and second metal sheets are bonded by diffusion bonding based on thermocompression bonding, and can therefore be made sufficiently thin (specifically, their thickness may be on the order of tens of micrometers), and a collimator can thus be formed in which a large number of holes tens of micrometers wide are disposed at intervals of tens of micrometers.

The third invention for achieving the aforementioned object is a two-dimensional collimator formed by alternately stacking first metal sheets having parallel holes in a plurality of rows and second metal sheets devoid of holes, pressing opposite sides thereof with pressing sheets, integrating these parts by diffusion bonding based on thermocompression bonding, and cutting the portions corresponding to the portions where the holes exist in the first metal sheets, in the stacking direction of the metal sheets.

In the present invention, the aforementioned parallel holes are arranged at an interval in one direction, and the holes are arranged according to the number of first metal sheets in the direction orthogonal thereto, as described in the aforementioned first means. It is thus possible to construct a two-dimensional collimator having the same structure as the aforementioned second invention.

The fourth invention for achieving the aforementioned object is a collimator in which metal sheets with holes whose length is sufficient to cover the width direction of the holes in the aforementioned first metal sheets in the cut portions are used instead of the second metal sheets in the aforementioned second and third inventions, and is otherwise manufactured by the method described with respect to the aforementioned second and third inventions.

Metal sheets having holes with a length sufficient to cover the width direction of the holes in the aforementioned first metal sheets in the cut portions are used instead of the second metal sheets in the present invention. Specifically, holes are opened in the cut portions of the second metal sheets, the length of the holes in the cutting planes is equal to or greater than the length of the holes in the cutting planes of the first metal sheets, and the holes in the second metal sheets cover the holes in the first metal sheets in the cutting planes.

Because of this, cutting may be performed until the cut portion reaches the holes in the first metal sheets during cutting, and there is no need to cut the portions of second metal sheets that comprise the barriers of the collimator holes (the holes are formed in advance) in the second metal sheets. These portions thus experience no deformation from the cutting force or heat during cutting.

The fifth invention for achieving the aforementioned object comprises any of the aforementioned inventions 2 through 4, wherein the holes formed in the first metal sheets have grid members formed in the lengthwise direction thereof.

The holes formed in the first metal sheets in the present means have grid members formed in the lengthwise direction, specifically, in the direction orthogonal with respect to the cutting planes thereof. These grid members serve as braces for supporting the second metal sheets that comprise the barriers of the collimator holes, and prevent deformation of the second metal sheets when the collimator is completed, as later described in detail in the embodiments section using the figures. It is thus possible to obtain a collimator whose holes have a regular shape.

The sixth invention for achieving the aforementioned object is a collimator comprising a capillary plate.

The capillary plate is conventionally made as an image intensifier, but is used as a collimator in the present means. The capillary plate is manufactured as follows. Dual-tube glass having different components for the inner tube and outer tube thereof is extended to an appropriate girth, disposed in a maximally packed configuration, and heat-treated to fusion-bond the glass tube. The inner tube of the dual tube is melted with acid after cross-sectional cutting, and a cavity is formed. Blackening is performed for the capillary plate formed in this manner, so that the surface and cavity sidewalls thereof are endowed with zero reflectivity.

In this arrangement, as light entering from one side of the capillary plate passes through the cavity, light that is parallel to the axis of the cavity proceeds straight through, and angled light is absorbed and attenuated every time it reflects off the cavity walls, failing to reach the surface on the opposite side when the cavity length is considerable. The capillary plate configured in this manner can thus be used as a collimator.

The seventh invention for achieving the aforementioned object comprises a spectrophotometer having a linear variable filter, a linear sensor, and a collimator for transmitting spectrally divided light emitted from the linear variable filter to the linear sensor, disposed between the linear variable filter and linear sensor, wherein the collimator used is any of the collimators according to any of the aforementioned first through sixth means.

The configuration of the present invention is generally identical to the configuration of the invention of "the prior application" described in the prior art, but differs in that a collimator according to any of the aforementioned inventions 1 through 6 is used instead of a fiber optic plate (FOP). An FOP is also a type of collimator, but the light propagates inside a fiber, and the wavelength dependence of the refractive index of the fiber affects the propagation characteristics. In contrast, the light transmission path in any of the collimators used in the present invention consists of air, so there is no wavelength dependence, and light ranging from infrared light to ultraviolet light can be spectrally divided.

An objective element linear sensor, which is an example of a spectrometer in which a linear variable filter is used, is extremely small, having a length of 12.5 mm and comprising 256 wavelength detecting elements, each 50 μm wide (width: 2500 μm). In addition, the pitch dimension of the collimator cavity should preferably be about 10–100 μm because the linear variable filter and the linear sensor have the same dimensions (1:1).

DESCRIPTION OF THE PREFERRED EMBODIMENTS

Figure 1:
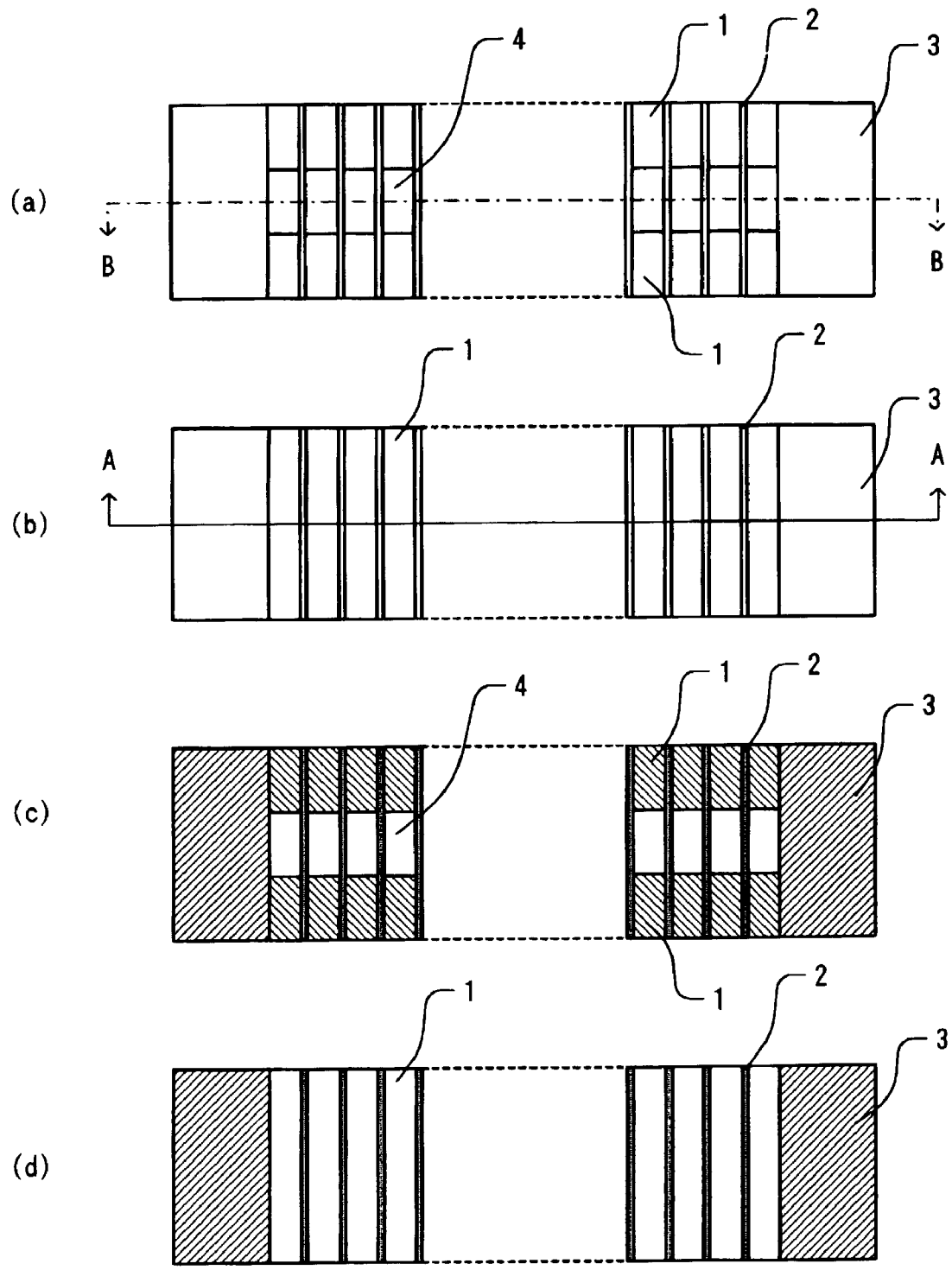
FIG. 1 is a diagram depicting a conceptual outline of the collimator according to the first example of the embodiments of the present invention.

Embodiments of the present invention will be described hereafter using the figures. FIG. 1 is a diagram depicting a conceptual outline of the collimator according to the first example of the embodiments of the present invention. In FIG. 1, (a) is a plan view; (b) is a front view; (c) is an A—A cross-sectional view; and (d) is a B—B cross-sectional view. Because this figure is a conceptual diagram for describing the structure, the dimensions shown do not correspond to actual dimensions.

As is apparent from the diagram, the collimator is obtained by the alternate stacking of metal sheets 1 (40 μm thick) having holes 4 with a width of 2200 μm in the center thereof, and metal sheets 2 (10 μm thick) without holes (here, "the metal sheets 1 with the holes 4" describes in the state in which they exist before being cut in the manner described below, the upper portion and the bottom portion of the metal sheets 1 in the figure (in the finished product) are not connected with each other). Both sides are held by pressing sheets 3 that are 2 mm thick. These metal sheets and pressing sheets are bonded by means of diffusion bonding based on thermocompression bonding.

The portions with the vertical through-holes 4 (40 μm×2000 μm) thus become light-transmitting portions, the metal sheets 2 serve as barriers between adjacent holes 4, and the light collimated to a width of 40 μm ultimately passes through. The metal thin sheet used may be any photoetchable metal thin sheet as long as this film can be stacked and diffusion-bonded using thermocompression bonding. In this case, however, an SUS sheet is used. The sheet has high strength and is comparatively inexpensive and widely available. Aluminum is another effective material, but SUS is superior in strength. The structure of the portion depicted by the dotted line in the figure is identical to the portions on the right and left thereof, and is thus not shown in the diagram. 256 metal sheets 1 and 255 metal sheets 2 are stacked, and 256 light passages are formed in this embodiment.

Figure 2:
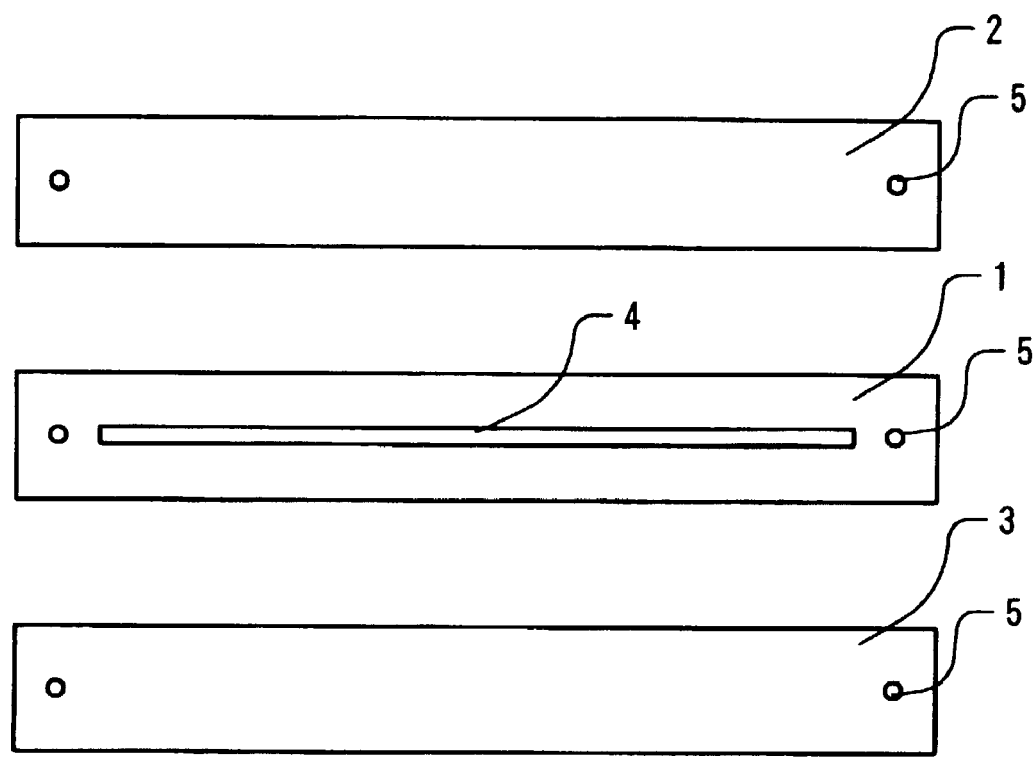
FIG. 2 is a diagram for describing an example of the manufacturing method for the collimator depicted in FIG. 1.

Because of the novelty of this collimator, an example of the manufacturing method thereof will be described. As depicted in FIG. 2, SUS thin sheets 1 with a length of 100 mm, a width of 8 mm, and a thickness of 40 μm; SUS thin sheets 2 with a length of 100 mm, a width of 8 mm, and with a thickness of 10 μm; and an SUS sheet 3 with a length of 100 mm, a width of 8 mm, and a thickness of 2 mm are prepared, and holes 4 measuring 40 μm×2200 μm are formed in the central portions of the SUS thin sheet 1 by photolithography and etching. Photolithography and etching are also used for each of the SUS thin sheets 1 and the SUS thin sheets 2, electric discharge machining is used for the SUS sheets 3 to make two holes 5 having a diameter of 2 mm in them. The reason that etching is used as a processing method is to eliminate the occurrence of weld flashing.

A 40-μm SUS thin sheet 1 is next placed over the 2-mm-thick SUS sheet 3, and a 10-μm SUS thin sheet 2 is stacked thereon. 40-μm and 10-μm SUS thin sheets are then alternately stacked. In this example, 256 40-μm SUS sheets 1 and 255 10-μm SUS sheets 2 are stacked, and a 2-mm-thick SUS sheet 3 is placed thereon. The sheets are then aligned using the holes 5 with the 2-mm diameters.

Figure 3:
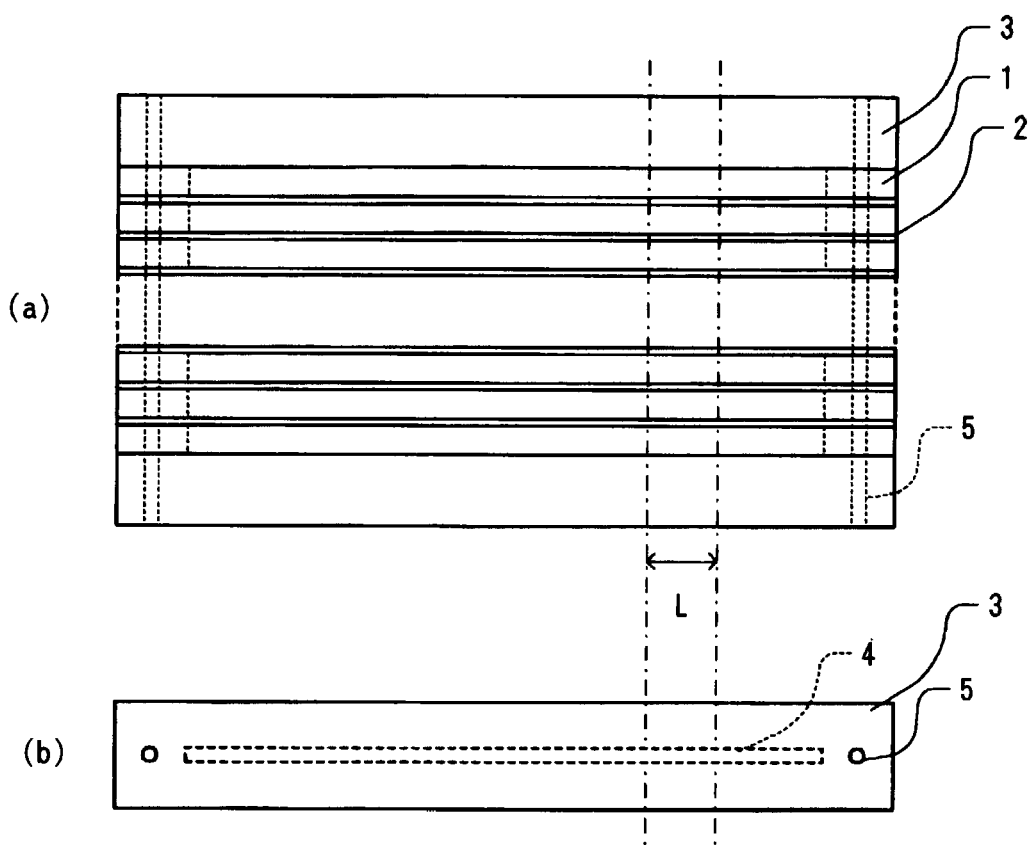
FIG. 3 is a diagram for describing an example of the manufacturing method for the collimator depicted in FIG. 1.

The stacked sheets must be joined to one another, since they are not secured in this state. A thermocompression bonding technique may be used herein to join together the contacting surfaces of the SUS sheets. To accomplish this, pressure is applied to the stacked portion with the aid of pressing sheets (using material not joined with the SUS) from above and below the stacked portions, the assembly in this state is placed in a vacuum heating furnace, the temperature is raised from room temperature to 1000° C. and held at this level, and the temperature is reduced when diffusion bonding is considered to be completed. This step takes about 24 hours. In this manner, a bonded multilayered sheet as depicted in FIG. 3 is completed. In FIG. 3, (a) is a plan view, and (b) is a side view.

The bonded multilayered sheet is then cut in the stacking direction thereof. The cutting location for cutting off a single collimator is shown by the dashed line in FIG. 3. Cutting is accomplished using wire cut electric discharge machining. A clean cut surface is obtained because the sheets are diffusion bonded. A collimator with height L as depicted in FIG. 1 is thus completed (the view from the right and left in FIG. 3 corresponds to (a) in FIG. 1). The height L of the collimator is determined by the length when the device is cut as depicted in FIG. 3. An advantage of this manufacturing method is that the height of the collimator can be machined to any value in the final step. L is enlarged for applications requiring high wavelength resolution. Applications requiring high speed can be accommodated using a lower L value.

Figure 4:
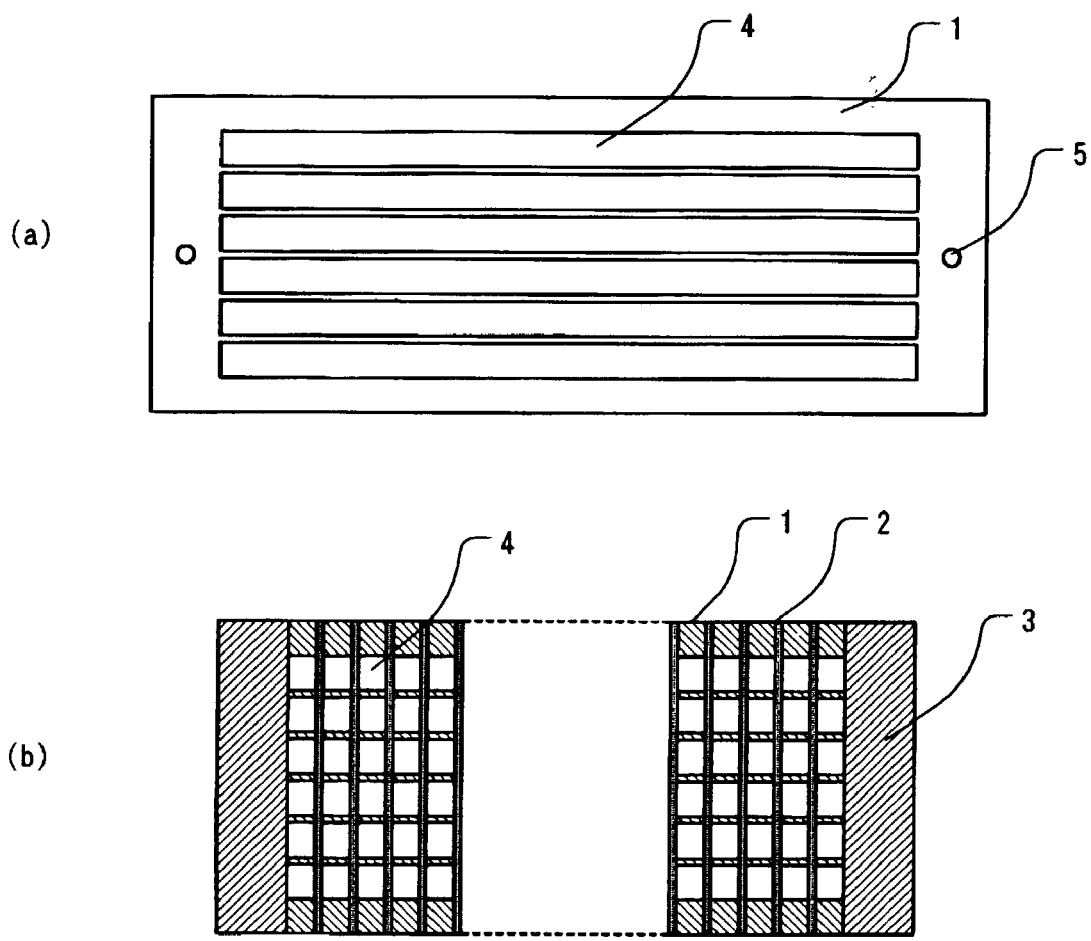
FIG. 4 is a diagram depicting an example of the structure of members for manufacturing a two-dimensional collimator, and an example of the cross-section of the two-dimensional collimator.

A one-dimensional collimator was described above, and a two-dimensional collimator according to the second embodiment of the present invention will next be described. Only one hole 4 was opened in the metal sheet 1 in FIG. 2, but as depicted in FIG. 4(a), a multitude (six are depicted in the figure, but any number thereof may be included) of rectangular holes 4 are formed in parallel at a prescribed interval in this embodiment. The metal sheets 2 and pressing sheets 3 are sized corresponding to the metal sheets 1, and a collimator is manufactured by the same method as the one used to manufacture the collimator depicted in FIG. 1.

This completes a two-dimensional collimator in which the cross-section corresponding to (c) in FIG. 1 is converted to a cross-section such as the one depicted in FIG. 4(b).

In the collimator thus manufactured, the metal sheets 2 sometimes undergo heat deformation and cannot be maintained parallel to each other when the holes 4 (vertical length in the figure) depicted in FIGS. 1 and 2 have considerable length. In such cases, a grid is formed as a reinforcement to the holes 4.

Figure 5:
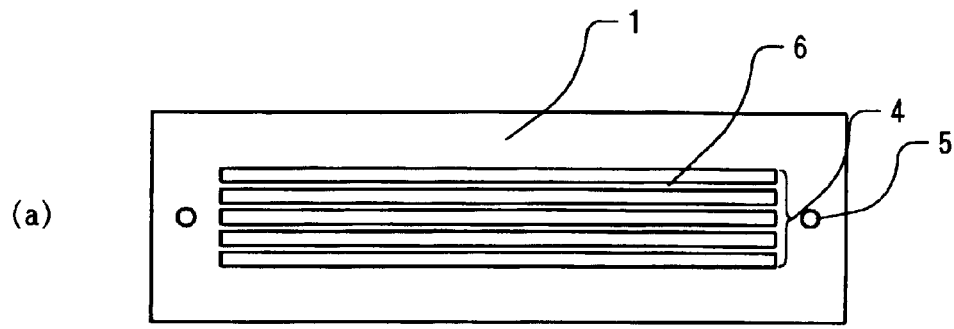
FIG. 5 is a diagram depicting an example of the structure of members for manufacturing a grid as a reinforcing member, and an example of the cross-section of a one-dimensional collimator having the grid.
Figure 5:
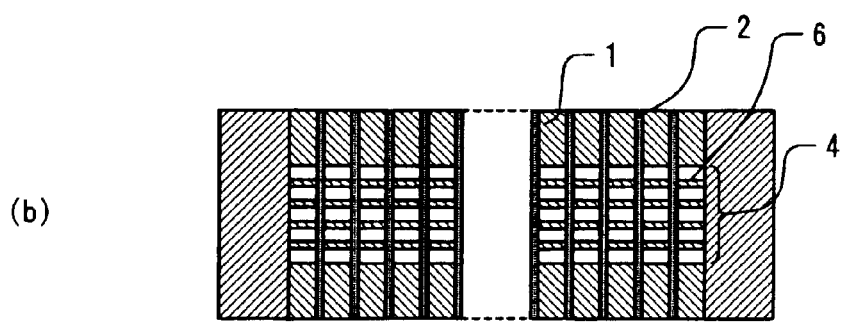

Specifically, a linear portion with a width of approximately 100 $\mu$m is left remaining in the hole 4 in the metal sheet 1 when a single hole 4 is formed by etching, as depicted in FIG. 5(a), such that a narrow grid 6 is formed. When a collimator is formed by such a method using this type of metal sheet, this collimator is formed such that the cross-section corresponding to (c) in FIG. 1 is converted to a cross-section such as the one depicted in FIG. 5(b). Specifically, a reliable collimator can be formed without bending the metal sheets 2 because the grid 6 is formed so as to reinforce the metal sheets 1 in this collimator. The light transmission efficiency declines slightly because light does not pass through the grid 6 portion, but about three grids are actually sufficient. Even when the width (vertical direction in FIG. 5) is 2200 $\mu$m and the grid 6 consists of three parts and has a width of 100 $\mu$m, the decline in transmission efficiency amounts to about 3/22, which is not a significant problem. It is apparent that the same method can be used for the aforementioned two-dimensional collimator as well.

Figure 6:
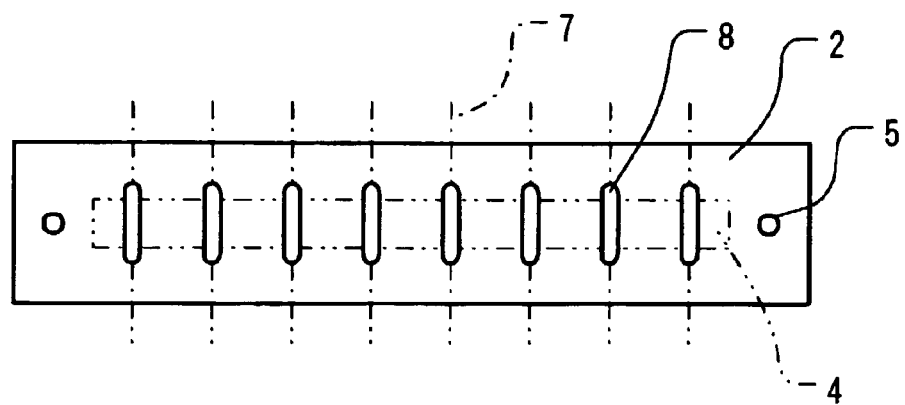
FIG. 6 is a diagram depicting the structure of members for preventing deformation during cutting.

Because the portions of the metal sheets 2 not held on the either sides by the metal sheets 1 (specifically, the portions corresponding to the holes 4) have low strength (being the strength of a sheet about 40 $\mu$m thick) when wire cut electric discharge machining is performed in any of the methods described above, these portions of the metal sheets 2 sometimes deform as a result of heat deformation or stress during cutting. The metal sheets 2 are shaped as depicted in FIG. 6 to prevent this phenomenon. Specifically, holes 8 are formed in advance by etching or the like in the central portion of the metal sheets 2 at positions aligned with cutting planes 7 formed by wire cut electric discharge machining. The holes are sized so as to completely cover the width direction (vertical direction in FIG. 6) of the holes 4 formed in the metal sheets 1 when the metal sheets 1 and 2 are superposed to each other. Specifically, the height thereof is equal to or greater than the width of the holes 4. In actuality, it is preferable that the width of the holes 4 and the height of the holes 8 be substantially identical, and that both types of holes be nearly completely superimposed over each other.

In this manner, the portion cut by wire cut electric discharge machining may extend to both holes 4 and 8, and almost none of the portion of the metal sheets 2 forming the side surface of the holes 4 undergoes wire cut electric discharge machining. This portion thus experiences no heat deformation, and an accurate slit is formed therein.

In any of the collimators described above, the metal sheets 1 are connected at first as a single sheet, but are divided into fine portions after undergoing wire cut electric discharge machining. However, the divided portions in this step remain together because they are bonded to the metal sheets 2 by diffusion bonding based on thermocompression bonding.

Figure 7:
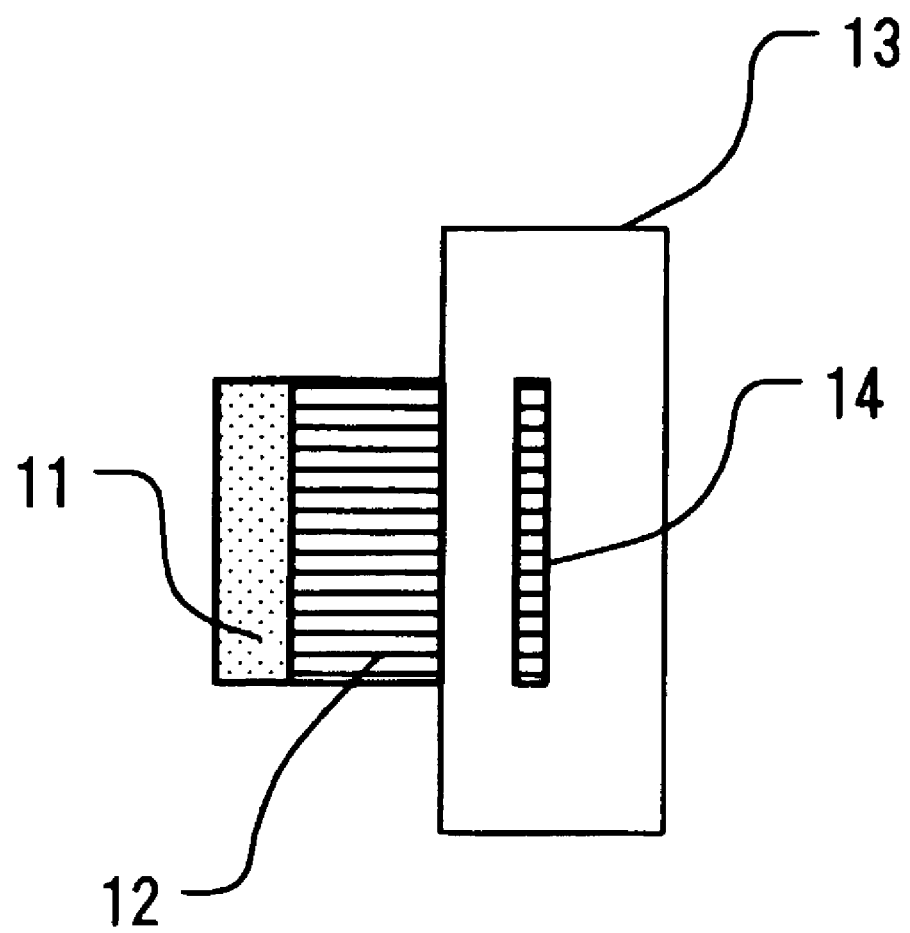
FIG. 7 is a diagram depicting a structural outline of a spectrophotometer as an example of an embodiment of the present invention.

FIG. 7 is a diagram depicting a structural outline of a spectrophotometer as an example of an embodiment of the present invention. This spectrophotometer is a one-dimensional spectral device, and is structured around a linear variable filter 11, a collimator 12, a linear sensor package 13, and a linear sensor 14. Light that is spectrally divided by the linear variable filter 11 passes through the collimator 12 and is guided to the linear sensor 14 inside the linear sensor package 13. The linear variable filter 11, collimator 12, and linear sensor package 13 are structured in contact with each other. The linear sensor 14 is secured within the linear sensor package 13, and has functionality for receiving light from the collimator 12 through a glass window (not shown) and converting the light into electrical signals.

The wavelength of the light passing through the linear variable filter 11 is determined according to the position in the width direction of the linear variable filter 11. The collimator 12 guides the light emitted from each position in the width direction of the linear variable filter 11 to the linear sensor 14 without mixing the light with light emitted from other positions. The spectral characteristics of the light entering the linear variable filter 11 can thus be determined by detecting the output of each element of the linear sensor 14.

Emitted light from the linear variable filter 11 can be transmitted in a state of low attenuation to the linear sensor 14, and sensitivity can be improved in the present embodiment because the collimator 12 is configured to transmit emitted light from the linear variable filter 11 to the linear sensor 14 with an air space as a medium.

Figure 8:
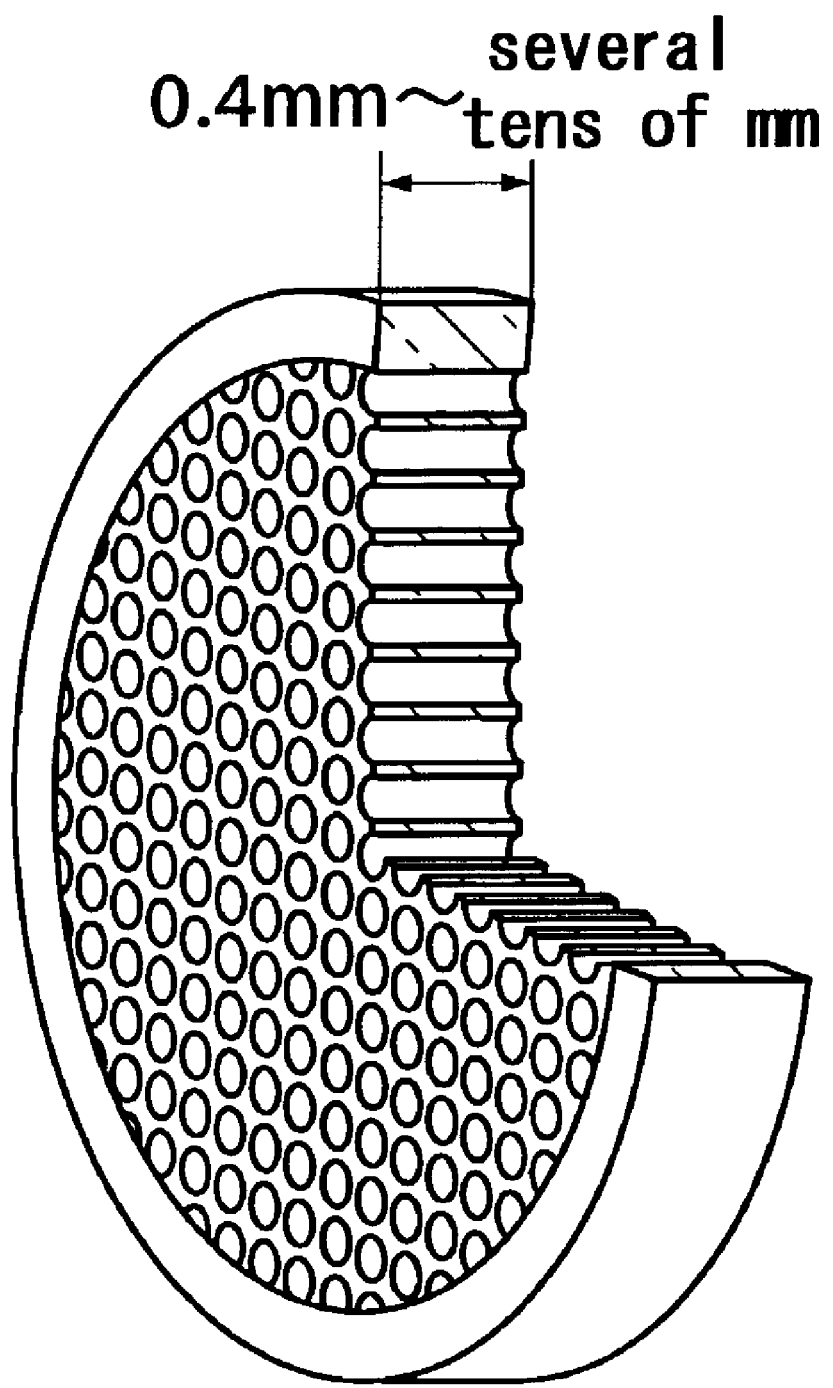
FIG. 8 is a diagram depicting an outline of a capillary plate used as a collimator.

FIG. 8 depicts the first example of a collimator used in the embodiment shown in FIG. 7. In this example, the capillary plate described in the homepage of Hamamatsu Photonics is used as the collimator. This capillary plate has holes with diameters of a few micrometers to several hundred micrometers formed in a regular manner in glass, and can be manufactured with a thickness of 0.5 mm to several tens of millimeters.

The capillary plate can be used as a collimator by applying a coating for complete absorption of light to the inner surface of the holes in the plate. The spectral wavelength emitted by the linear variable filter 11 is transmitted to the linear sensor 14 by means of this collimator.

However, this embodiment has drawbacks whereby the aperture ratio of the capillary plate is low, being 55% at the most, and the light transmission efficiency is also low because the holes are circular. Particularly when the device used is a one-dimensional spectrometer, the number of unusable portions increases because of the overall circular shape of the capillary plate.

These problems can be overcome using a collimator such as the one depicted in FIG. 1, or a modified example (with a grid) of a collimator such as the one described above, which are embodiments of the present invention. Specifically, because the openings in these collimators are rectangular, the transmission surface area of light can be enlarged for the capillary plate, thus making it possible to increase the light transmission efficiency.

FIG. 7 depicts a one-dimensional dividing device, but if a wide device is used for the linear variable filter 11, a two-dimensional spectral device can easily be configured by converting the collimator 12 to a two-dimensional collimator, and constructing the linear sensor 14 as a two-dimensional device.

In this case, even if a capillary plate is used for the collimator 12, drawbacks are eliminated to a certain degree when compared with the case of a one-dimensional spectral device, but a decline in light transmission efficiency cannot be avoided inasmuch as the holes are circular. Consequently, the light transmission efficiency can be enhanced when using a two-dimensional collimator such as the one depicted in FIG. 4, or the modified example having the grid.

A one-dimensional collimator with a grid as depicted in FIG. 5(*b*) was manufactured. SUS was used in the metal sheets 1, metal sheets 2, and pressing sheets 3; the metal sheets 1 were 90 $\mu$m thick, the metal sheets 2 were 10 $\mu$m thick, and the pressing sheets were 2 mm thick; and the holes 4 formed by photolithography and etching were 2200 $\mu$m wide. As depicted in FIG. 5(*a*), a five-member grid with a width of 100 $\mu$m was formed at regular intervals within the 2200-$\mu$m space. As depicted in FIG. 6, holes 8 with a width (horizontal direction in the figure) of 1 mm and a length (vertical direction in the figure) of 2400 $\mu$m were formed in the center of the metal sheets 1 by photolithography and etching at 4-mm intervals in the transverse direction of the figure. 128 metal sheets 1 and 127 metal sheets 2 were alternately stacked on a pressing sheet 3, another pressing sheet 3 was ultimately placed thereon, the assembly was diffusion-bonded by thermocompression bonding according to the method described in the embodiments, and the portion with the holes 8 opened therein was cut by wire cut electric discharge machining. A collimator with a thickness of 3 mm, a width of 2200 $\mu$m, and a length of approximately 15.8 mm was thereby completed. 128 holes 90 $\mu$m wide and 2200 $\mu$m long are formed in this collimator.

Figure 9:
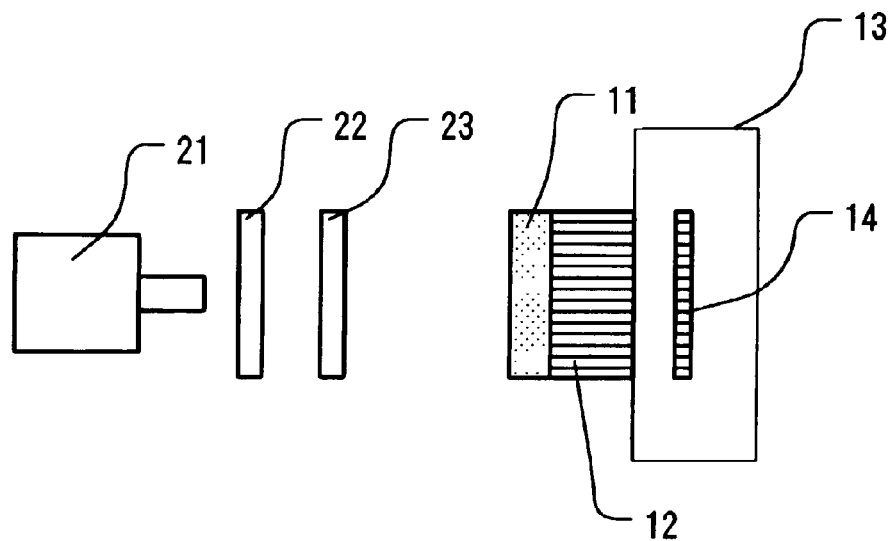
FIG. 9 is a diagram depicting an outline of a device used for investigating the characteristics of the spectrophotometer according to an embodiment of the present invention.

The spectral characteristics of the one-dimensional spectral device depicted in FIG. 7 and obtained using this collimator were investigated using a device such as the one depicted in FIG. 9. A parallel beam of light having a continuous spectrum emitted from a parallel light source 21 is diffused by a diffusion plate 22 and transmitted by a wavelength calibrating filter 23, and the wavelength distribution is measured by a one-dimensional spectral device such as the one depicted in FIG. 7.

Figure 10:
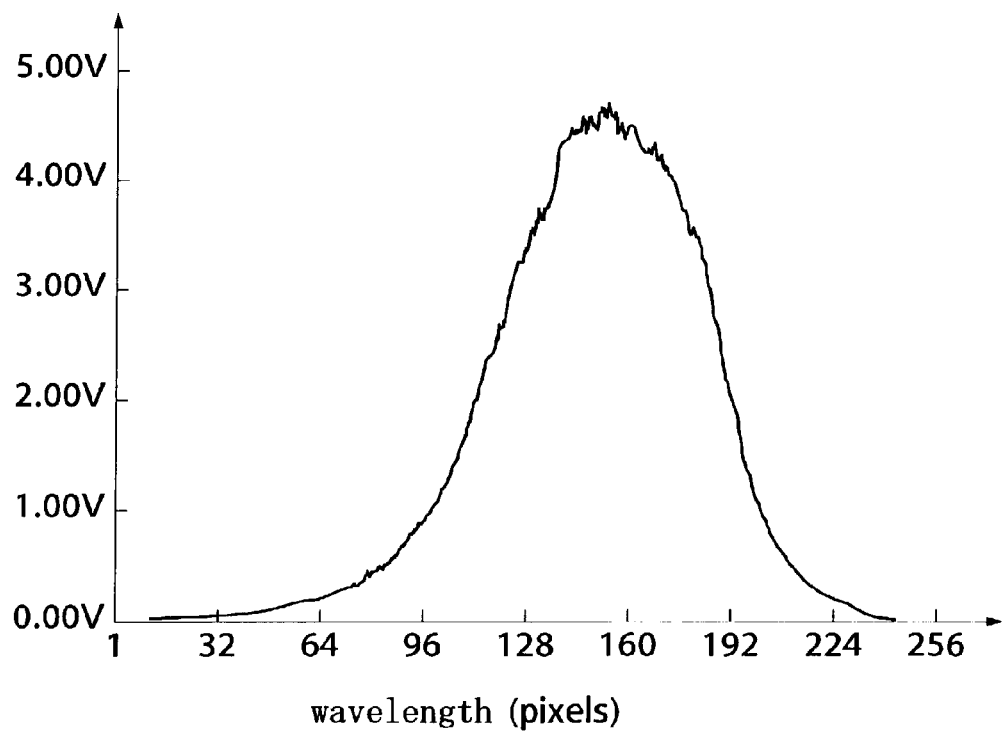
FIG. 10 is a diagram depicting the results of direct spectral decomposition of light emitted from a parallel light source.
Figure 11:
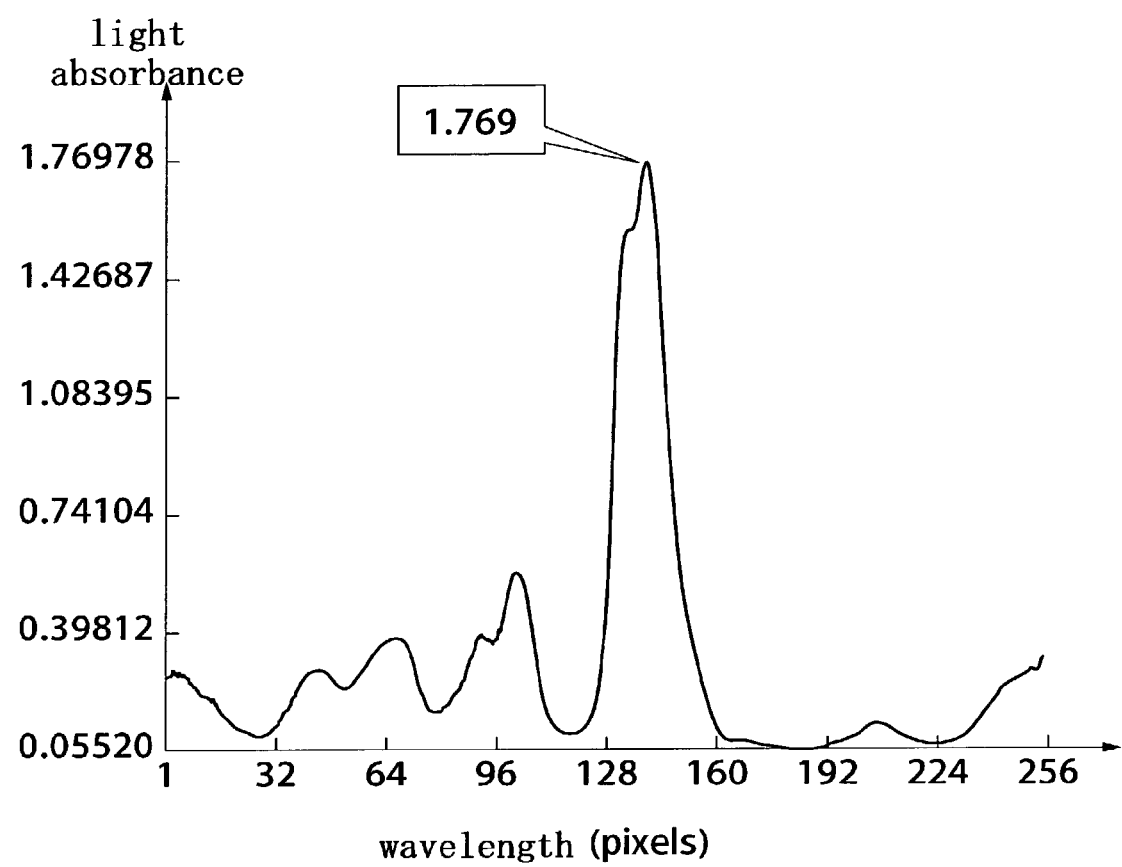
FIG. 11 is a diagram depicting the results of spectral decomposition of emitted light from a parallel light source through a didynium filter.

FIG. 10 shows the results of direct spectral decomposition of light emitted from the parallel light source 21 without using the diffusion plate 22 or wavelength calibrating filter 23; and FIG. 11 shows the results of spectral decomposition of light obtained when a didynium filter is used as the wavelength calibrating filter without the use of the diffusion plate 22. The theoretical light absorption peak wavelength for a didynium filter is 580 nm, and the theoretical light absorbance thereof is 1.80, but, as is apparent from FIG. 11, there is a peak at a wavelength corresponding to 580 nm (shown in the figure as pixel units of a linear sensor), and the light absorbance thereof is 1.769. It is now apparent that the resolution of this spectral device is particularly high. As previously mentioned, such high wavelength resolution is obtained even when an interval of approximately 2 mm is provided between the collimator 12 and the linear sensor 14, because a collimator calibrated in the above-described manner has extremely good collimating characteristics.

By contrast, the FOP and linear sensor had to be attached and the linear sensor package 13 had to be machined in the invention of "the prior application". In the present embodiment, adequate characteristics are also obtained because of such characteristics when the collimator 12 is connected to the linear sensor package 13.

Figure 12:
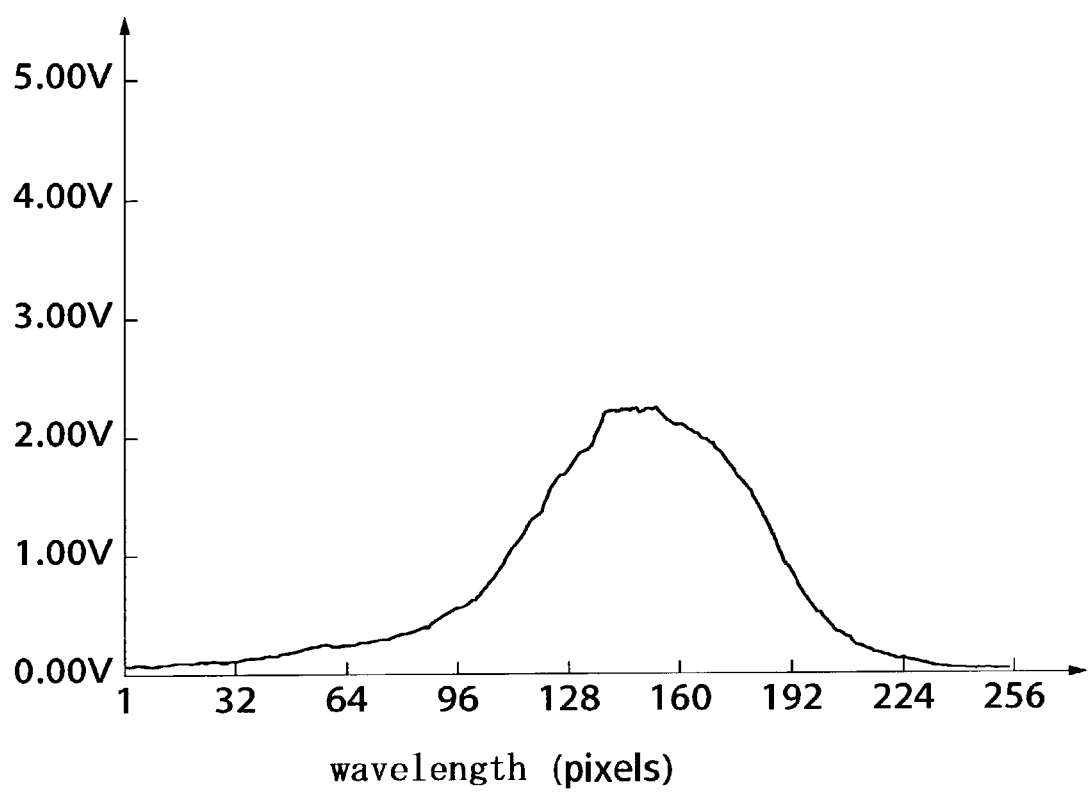
FIG. 12 is a diagram depicting the results of spectral decomposition of emitted light from a parallel light source via a diffusion plate.

A diffusion plate 22 was provided in front of the didynium filter, and the same type of experiment was performed to further investigate the collimator performance. FIG. 12 shows the results of measuring the spectral characteristics obtained when the diffusion plate 22 alone was provided, without any didynium filter. According to a comparison between FIGS. 10 and 12, both characteristics remain substantially unchanged regardless of the predicted decline in wavelength resolution in FIG. 12 because light enters the linear variable filter 11 from various angles in FIG. 12. This is attributed to the fact that because the collimator 12 has adequate collimating characteristics, only rectilinearly propagating light is transmitted to the linear sensor 14 even when the diffused light enters the linear variable filter 11.

Figure 13:
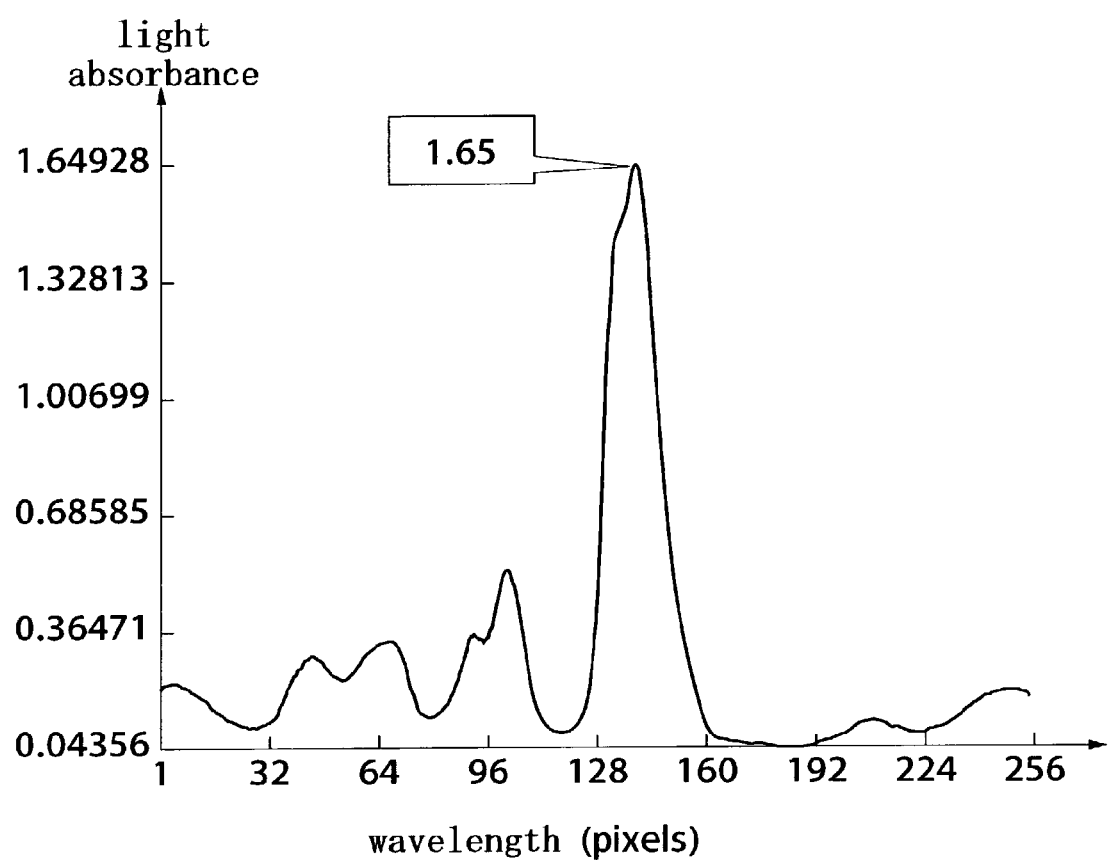
FIG. 13 is a diagram depicting the results of spectral decomposition of emitted light from a parallel light source via a diffusion plate and didynium filter.

FIG. 13 shows the results obtained when a didynium filter is introduced as a wavelength calibrating filter 23 behind the diffusion plate 22, and light passing therethrough is spectrally divided. An absorption peak also appears in FIG. 13 at a position corresponding to 580 nm, which is the theoretical light absorption peak wavelength of a didynium filter, and the absorption curve pattern is almost identical to the one depicted in FIG. 11. However, the absorbance is 1.65, which is somewhat lower than in the case in which the diffusion plate is absent.

As is apparent from the results above, high wavelength resolution is obtained using the aforementioned collimator even when the light consists of diffused light, and there is an interval between the collimator and the linear sensor.

Figure 14:
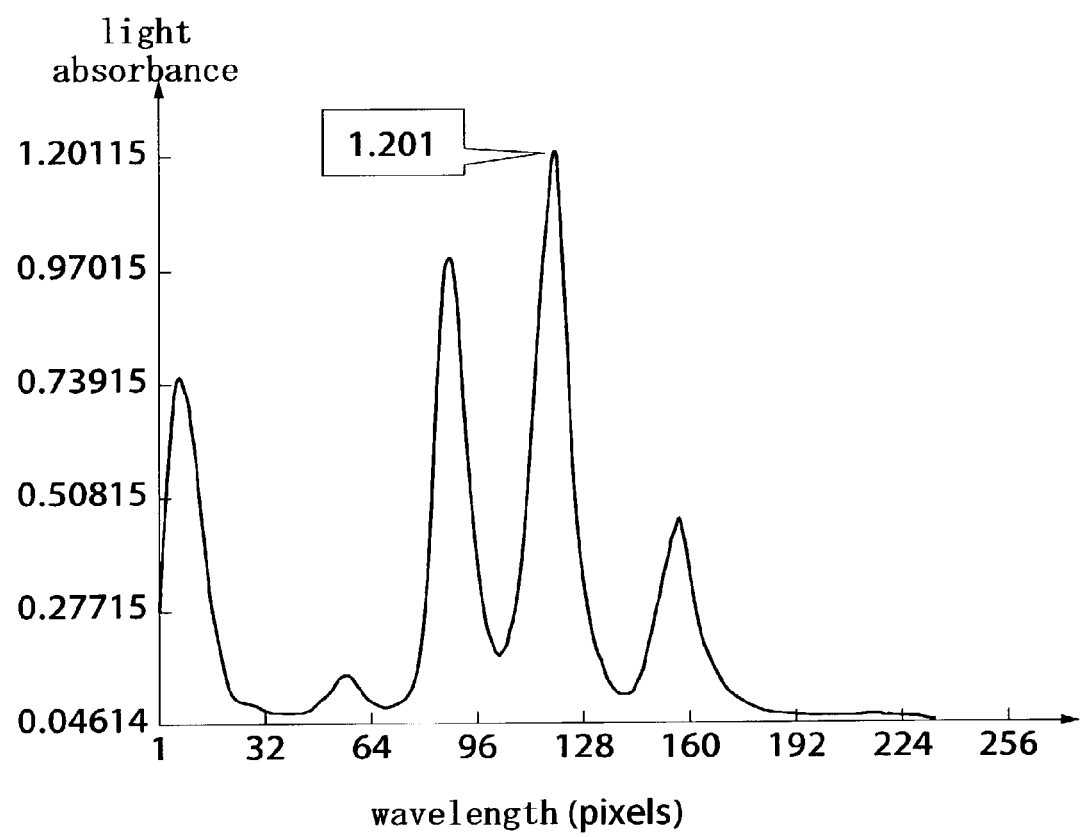
FIG. 14 is a diagram depicting the results of spectral decomposition of light transmitted through a didynium filter using an infrared light source as a parallel light source.

The experiments described above are for visible light, but FIG. 14 shows the results obtained by spectrally dividing transmitted light using an infrared light source as the parallel light source 21, and using only a didynium filter without inserting a diffusion plate 22. The absorption peak of the didynium filter for infrared light is 800 nm, and the theoretical light absorbance thereof is 1.20, and there was an absorption peak at 800 nm in the spectrometer as well, and the measured light absorbance of 1.201 was extremely close to the theoretical value. It is thus apparent that the spectrometer can also be used for the spectral decomposition of infrared light as well.

Figure 15:
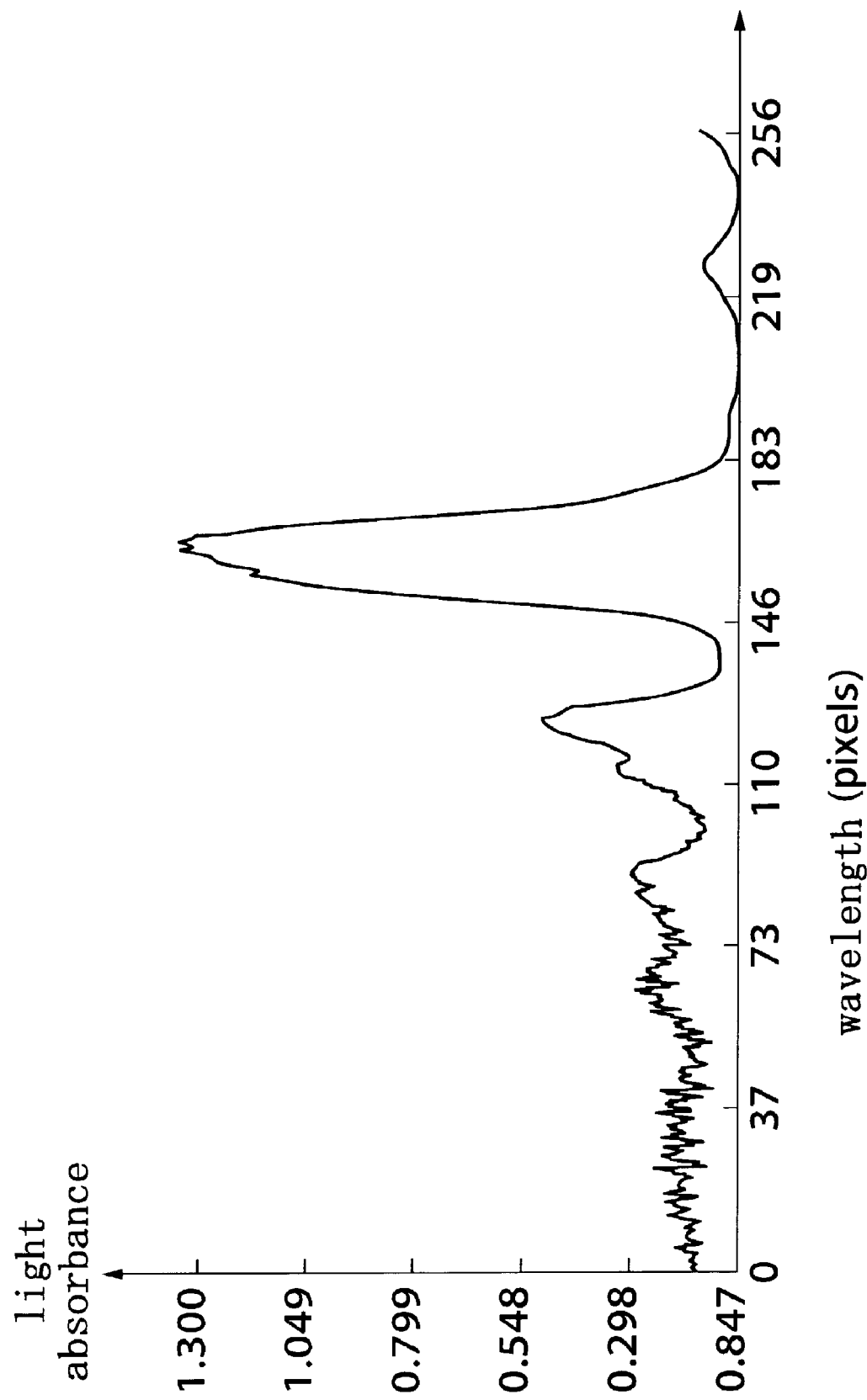
FIG. 15 is a diagram depicting the results of spectral decomposition of emitted light from a parallel light source through a didynium filter in the invention of "the prior application", in which an FOP is used as a collimator.
Figure 16:
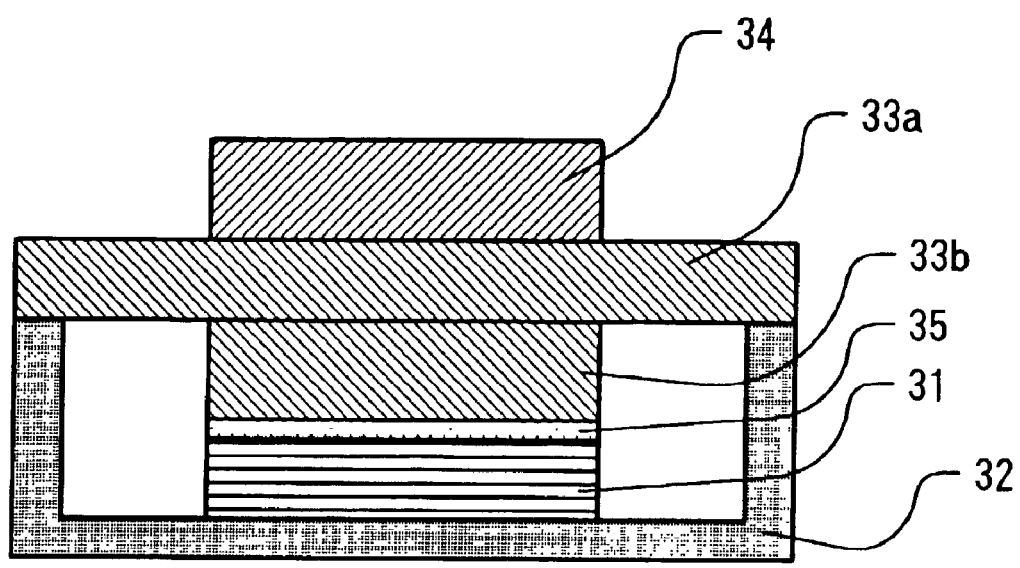
FIG. 16 is a diagram depicting an example of the configuration of the spectral device of the invention of "the prior application".

FIG. 15 depicts spectral characteristics as a comparative example obtained using a spectral device (depicted in FIG. 16) featuring the fiber optic plate described in the invention of "the prior application", and using the diffusion plate 22 and didynium filter. The light absorption peak for the didynium filter absorption wavelength of 580 nm declines to 1.30, and the waveform generally falls off. This is because the collimator performance is poor in comparison with the embodiments of the present invention.

What is claimed is:

1. A collimator comprising:
a plurality of first metal layers, each having a through-hole formed therethrough;
a plurality of second metal layers; and
a pair of pressing sheets, one of said pressing sheets being provided on each side of the collimator;
wherein the first metal layers and the second metal layers are alternately stacked between the pair of pressing sheets such that the through-hole extending through each of the first metal layers extends through the collimator and is separated from the through-hole of any adjacent first metal layers by one of the second metal layers.

2. The collimator according to claim 1, further comprising at least one grid member in the through-hole of each of the first metal layers.

3. A spectrophotometer comprising:
a linear variable filter;
a linear sensor; and
the collimator according to claim 1 provided between the linear variable filter and the linear sensor to transmit spectrally divided light emitted from the linear variable filter to the linear sensor.

4. A spectrophotometer comprising:
a linear variable filter;
a linear sensor; and
the collimator according to claim 2 provided between the linear variable filter and the linear sensor to transmit spectrally divided light emitted from the linear variable filter to the linear sensor.

5. A two-dimensional collimator comprising:
a plurality of first metal layers each having a plurality of separate throughholes extending therethrough;
a plurality of second metal layers; and
a pair of pressing sheets, one of said pressing sheets being provided on each side of the two-dimensional collimator;
wherein the first metal layers and the second metal layers are alternately stacked between the pair of pressing sheets such that the plurality of through-holes extending through each of the first metal layers extend through the collimator and are separated from the plurality of through-holes of any adjacent first metal layers by one of the second metal layers.

6. A spectrophotometer comprising:
a linear variable filter;
a linear sensor; and
the collimator according to claim 5 provided between the linear variable filter and the linear sensor to transmit spectrally divided light emitted from the linear variable filter to the linear sensor.

* * * * *